US009344820B2

(12) United States Patent
Sanchez et al.

(10) Patent No.: US 9,344,820 B2
(45) Date of Patent: May 17, 2016

(54) METHOD, APPARATUS, AND SYSTEM FOR MASS AUDIO NOTIFICATION FIELD

(75) Inventors: Pedro I. Sanchez, Kanata (CA); Matthew T. Battig, Consecon (CA); Ying Du, Kanata (CA)

(73) Assignee: Benbria Corporation, Kanata (CA)

( * ) Notice: Subject to any disclaimer, the term of this patent is extended or adjusted under 35 U.S.C. 154(b) by 1259 days.

(21) Appl. No.: 12/770,896

(22) Filed: Apr. 30, 2010

(65) Prior Publication Data

US 2011/0268286 A1 Nov. 3, 2011

(51) Int. Cl.
*H04R 27/00* (2006.01)
*H04B 3/00* (2006.01)
*H04R 3/12* (2006.01)

(52) U.S. Cl.
CPC *H04R 27/00* (2013.01); *H04R 3/12* (2013.01); *H04R 2227/003* (2013.01)

(58) Field of Classification Search
CPC .......... H04R 27/00; H04R 27/02; H04R 1/02; H04R 3/04; H04R 3/12; H04R 7/301; H04R 29/00; H04R 29/001; H04R 29/007; G06Q 30/0201; G06Q 10/00
USPC ........ 381/77-85, 310-311, 59; 709/201-203, 709/217-219, 227-229, 206, 207; 719/318
See application file for complete search history.

(56) References Cited

U.S. PATENT DOCUMENTS 5,406,634 A * 4/1995 Anderson et al. ............... 381/82
6,389,463 B2 * 5/2002 Bolas et al. ................... 709/219
8,130,983 B2 * 3/2012 Cheng ........................... 381/123
8,243,949 B2 * 8/2012 Bhow et al. ...................... 381/81
2002/0072816 A1 * 6/2002 Shdema et al. ................. 700/94
2002/0147814 A1 10/2002 Kimchi et al.
2003/0220705 A1 * 11/2003 Ibey ......................... H04R 5/04 700/94
2004/0034807 A1 * 2/2004 Rostowfske ........ G06F 11/2097 714/4.1
2004/0165732 A1 * 8/2004 Arcaria et al. ....... H04R 29/007 381/81
2006/0187900 A1 * 8/2006 Akbar ........................... 370/352
2006/0221970 A1 10/2006 Walter
2008/0052348 A1 * 2/2008 Adler et al. ................... 709/203
2010/0303250 A1 * 12/2010 Goldberg et al. ............... 381/59
2011/0154204 A1 * 6/2011 Narayanaswamy .......... 715/727

FOREIGN PATENT DOCUMENTS

EP 2202915 A1 6/2010

OTHER PUBLICATIONS

The International Searching Authority, "PCT International Search Report", for application PCT/CA2010/000675, applicant Benbria Corporation et al.
The International Searching Authority, "PCT Written Opinion of the International Searching Authority", for application PCT/CA2010/000675, applicant Benbria Corporation et al.

* cited by examiner

*Primary Examiner* — Xu Mei
(74) *Attorney, Agent, or Firm* — Nixon Peabody LLP

(57) ABSTRACT

A mass audio notification system is provided, comprising a network, a plurality of speakers connected to the network, and at least one server connected to the network. The server can send audio data to at least one of the plurality of speakers via a transport link, and the server can send control commands to at least one of the plurality of speakers. The transport link can include a first protocol based on internet protocol.

8 Claims, 14 Drawing Sheets

METHOD, APPARATUS, AND SYSTEM FOR MASS AUDIO NOTIFICATION FIELD

FIELD

The specification relates generally to notification, and specifically to a method, apparatus, and system for mass audio notification.

BACKGROUND

The use of speakers for mass audio notification has traditionally been achieved through self-contained, analogue systems. The speaker output is either driven in real-time by an announcer or by a pre-recorded message which may be automatically created by a computer system, manually recorded by the announcer, or both. These standalone speaker systems, while usually reliable for day-to-day operation, present a number of difficulties when an attempt is made to turn them into an integral part of a full mass audio notification system. These problems include: cumbersome maintenance due to the presence of two separated management and configuration systems, one for the digital notification system, and one for the standalone analogue system; lack of scalability since the analogue speakers are usually constrained to operate within a concentrated geographical area, under power-restricted budgets and cable-length limitations; limited selective notification options since the standalone systems only support "notify all speakers" or intercom-like operations; limited or non-existent centralized configuration options for speaker operation; and lack of intelligent, pro-active, reporting from the analogue speakers of their current states.

In addition, existing mass audio notification systems do not allow for batch configuration of several speakers.

SUMMARY

According to an aspect of the specification, a mass audio notification system is provided, comprising: an internet protocol network; a plurality of speakers connected to the internet protocol network; and at least one server connected to the internet protocol network, the at least one server configured to send audio data to at least one of the plurality of speakers via a transport link, the server further configured to send control commands to at least one of the plurality of speakers, wherein the transport link includes a first protocol based on internet protocol.

According to a further aspect of the specification, a method implemented on a speaker for outputting audio on the speaker from a server is provided, the speaker interconnected with the server via an internet protocol network , the method comprising: registering the speaker with the server, via a connectivity link, the connectivity link including a first protocol based on internet protocol; receiving audio data from the server, via a transport link, the transport link including a second protocol based on internet protocol; and outputting the audio data on the speaker.

According to another aspect of the specification, a method for outputting audio data from a server on a plurality of speakers is provided. The server is interconnected with the plurality of speakers via an internet protocol network in a mass audio notification system. The method comprises registering at least one of the plurality of speakers; and sending audio data to the at least one of the plurality of speakers to cause the at least one of the plurality of the speakers to output the audio data.

According to yet another aspect of the specification, a method for configuring a plurality of speakers is provided, the method comprising receiving a selection of a group of one or more speakers; receiving updated parameters to be applied to each of the one or more speakers; retrieving a respective speaker profile for each of the one or more speakers and writing the updated parameters to the respective speaker profile.

BRIEF DESCRIPTIONS OF THE DRAWINGS

Embodiments are described with reference to the following figures, in which.

DETAILED DESCRIPTION OF THE EMBODIMENTS

Figure 1:
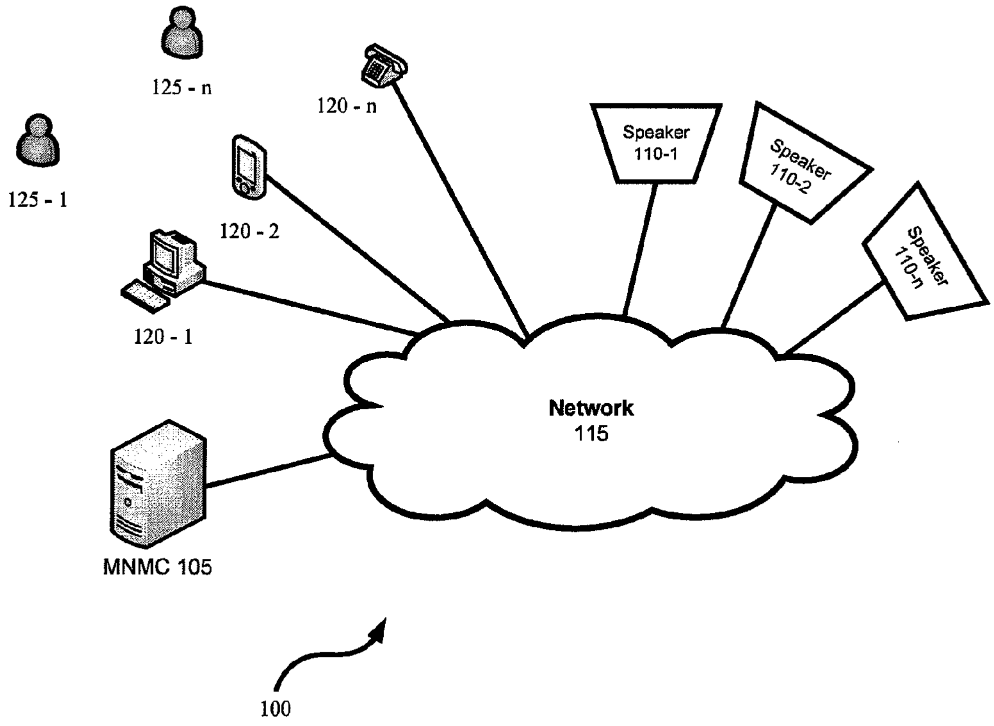
FIG. 1 is a schematic diagram of a mass audio notification system according to a non-limiting embodiment.

FIG. 1 depicts a mass audio notification system 100 comprising a Mass Notification Management Center (MNMC) 105 interconnected with a plurality of speakers 110-1, 110-2, . . . , **110-*n* (hereafter, generically these are referred to as the speaker 110, and collectively, as the speakers 110), via a network 115. Throughout this description the term speaker is also intended to include any Internet Protocol-capable device (e.g. computers, smart phones, IP phones, etc) configured to be remotely controlled to output a sound or other message. It will be understood that multiple instances of the MNMC can be configured in the system 100 where some instances act as backup in case of failure. The mass audio notification system 100 further comprises a plurality of client devices 120-1, 120-2, . . . , 120-*n* (hereafter, generically these are referred to as the client device 120, and collectively, as the client devices 120) connected to the MNMC 105, via the network 115. The MNMC 105 is a server that receives instructions from the client devices 120 to broadcast audio messages to the speakers 110. The client devices 120 are used by the users 125-1, . . . , 125-*n* (hereafter, generically these are referred to as the user 125, and collectively, as the users 125) to configure and use the system via the MNMC 105**.

Figure 2:
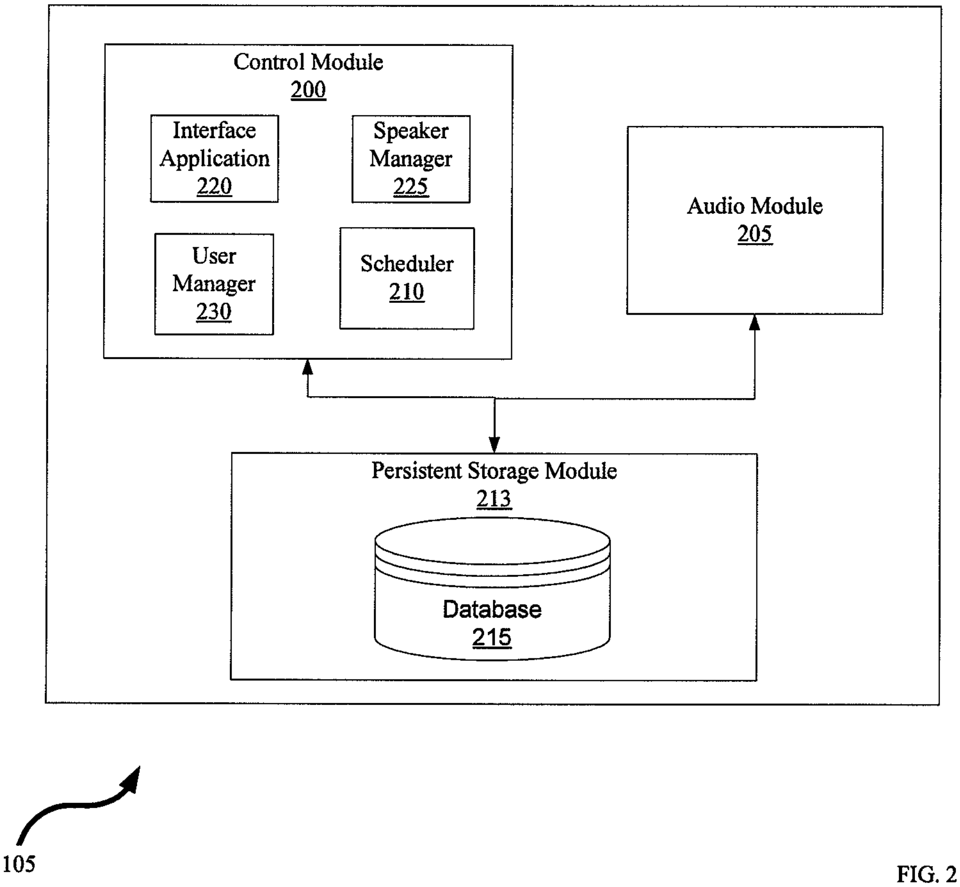
FIG. 2 is a block diagram of applications executable on a Mass Notification Management Center (MNMC) of the system of FIG. 1.

Referring to FIG. 2, a block diagram of certain applications executable by the MNMC 105 is shown. The MNMC 105 includes a control module 200, an audio module 205, and a persistent storage module 213 which may include a database 215. It will be understood that persistent storage module 213 can control the various storage hardware devices of MNMC 105, such as hard disc drives and the like. It will also be understood that the various modules can be implemented as separate physical servers. For example, an audio server and a control server can be provided, each based on known server computing environments. The control module 200 performs non-audio related management tasks such as configuring the speakers 110, registering the speakers 110, and accepting commands from the client devices 120. The control module 200 includes an interface application 220, a speaker manager 225, a user manager 230, and a scheduler 210. The interface application 220 manages a web interface 222 (see FIG. 6) and a telephone interface (not shown) to enable the client devices 120 to access the MNMC 105. As will now be apparent to those skilled in the art, control module 200 can include various server environments, such as a Private Branch Exchange (PBX), a media server and the like. Persistent storage module 213 provides storage for information such as pre-recorded audio messages that are to be broadcasted, pre-configured instructions on how to broadcast certain messages, user security information, and the like. As will now be apparent to those skilled in the art, database 215 can include one or more relational databases, one or more collections of flat files, or any suitable combination of the above. The database 215 is accessible by the control module 200 either directly or indirectly through the interface application 220, the speaker manager 225, or the user manager 230. The scheduler 210 executes scheduled broadcasts. The audio module 205 performs audio related tasks such as transmitting audio data to the speakers 110. It will now be appreciated that the control module 200 and the audio module 205 can reside together on one server or separately on separate interconnected servers and that the MNMC 105 can be one MNMC or a network of MNMCs. MNMC 105 can be based on a well known server environment, comprising one or more central processing units (CPU), volatile and non-volatile memory and communication interfaces, housed within an enclosure. In an active-standby multiple server setup, the persistent storage module 213 on an active server is mirrored on one or more standby or backup servers, providing an additional layer of redundancy. The standby servers can be physically away from the active server to provide resiliency in case of a regional failure affecting one server. In some embodiments, the standby servers replicate all data from the active server in real time. A heartbeat process is in place to keep track of both active and backup servers' correct operations. The moment the active server fails to perform its operations for any reason, the second server comes online and services the request to reduce overall system down time.

Additionally, the persistent storage module 213 can be backed up on a daily, weekly, and/or monthly rotation, allowing system 100 to be restored to any saved data copy, safeguarding against data corruption or accidental data deletion.

Figure 3:
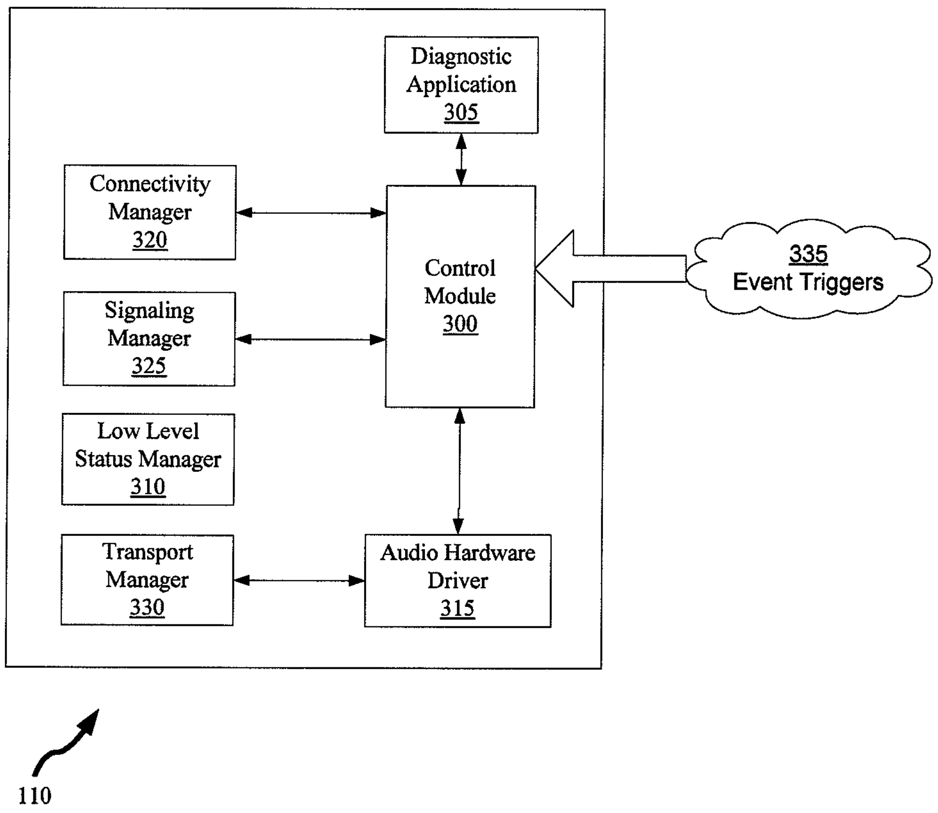
FIG. 3 is a block diagram of applications executable on a speaker of the system of FIG. 1.

Referring to FIG. 3, a block diagram of certain applications executable by the speaker 110 is shown. The speaker 110 includes a control module 300, a diagnostic application 305, a low level status manager 310 and an audio hardware driver 315. Control module 300 is responsible for coordinating the activity of the other various components of speaker 110 and for detecting event triggers (represented schematically at

335). Such event triggers can be requests or commands received from MNMC 105, for example, or environmental events local to speaker 110. Speaker 110 further includes a connectivity manager 320, a signalling manager 325 and a transport manager 330. The audio hardware driver 315 controls speaker 110 to play audio data. It will now be apparent to those skilled in the art that such audio data can be received from the MNMC 105 or can be stored locally by speaker 110 (and played in response to commands received from MNMC 105). Audio data received from MNMC 105 can originate from any user device 120. For example, audio data can originate from a telephone, a mobile electronic device or a personal computer. It will now be apparent that audio hardware driver 315 can also be responsible for converting audio data into a suitable format for playing at speaker 110. Each of the low level status manager 310, the connectivity manager 320, the signalling manager 325 and the transport manager 330 manage traffic over respective links between the speaker 110 and the MNMC 105, as will be discussed below in connection with FIG. 5. The diagnostic application 305 conducts low level and high level diagnostics of the speaker 110. For example, diagnostic application 305 can conduct self-tests at speaker 110 and report the results of such tests to MNMC 105, as will be discussed in greater detail below. Low level status manager 310 also has diagnostic capabilities. In particular, low level status manager 310 can be configured to start up earlier than the other applications of speaker 110, and to log any errors that occur during the startup of other applications. Low level status manager 310 can also be configured to transmit a report of any such errors over a low level status link when network connectivity is available. If no connectivity is available, the report can be stored locally at speaker 110.

Figure 4:
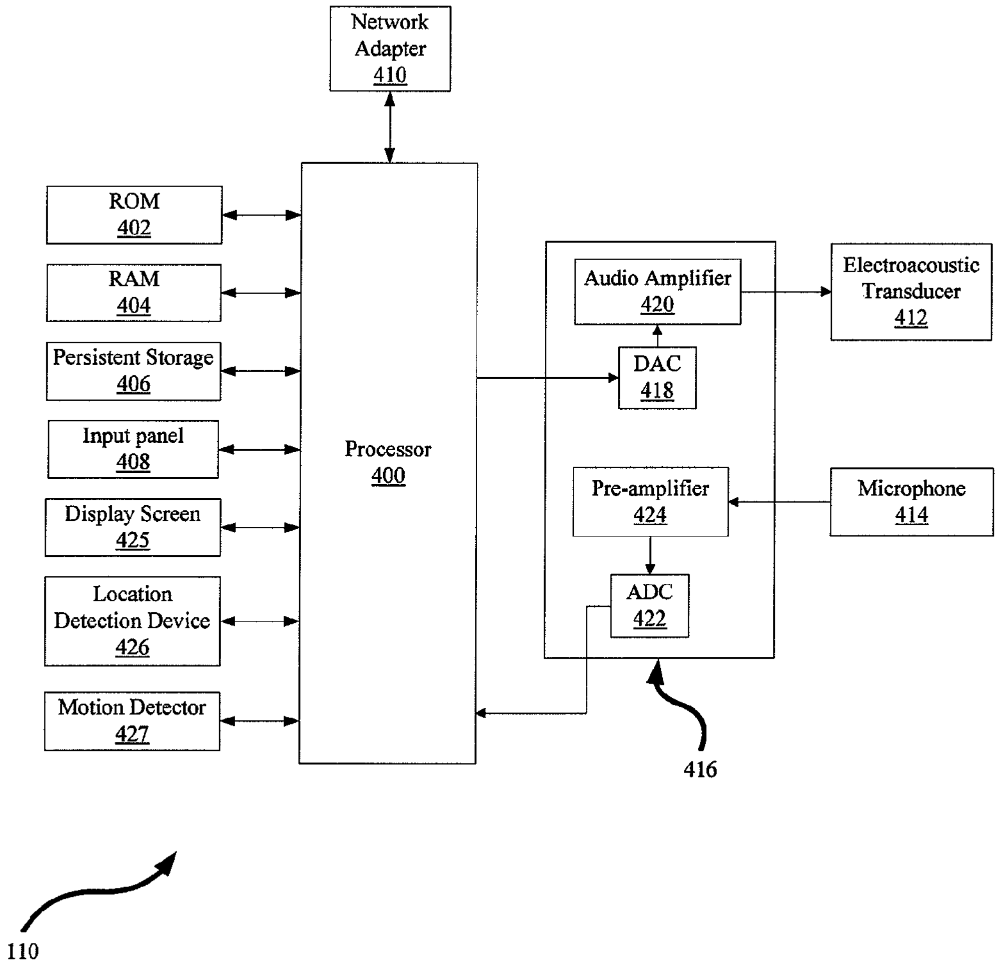
FIG. 4 is a block diagram of certain components of the speaker of FIG. 3.

Referring to FIG. 4, a block diagram of certain components within the speaker 110 is shown. The speaker 110 includes a processor 400 interconnected with a read-only-memory (ROM) 402 that stores, for example, a Basic Input/Output System (BIOS) for execution when the speaker 110 is turned on. The processor 400 is also connected to a random access memory unit (RAM) 404 and a persistent storage device 406, which are responsible for various storage functions of the speaker 110. Persistent storage device 406 can comprise a flash memory for storing, among other data, the computer-readable instructions implementing the applications of FIG. 3. In some embodiments, persistent storage device 406 can also comprise a hard disk or any other suitable computer readable storage medium. The processor 400 can receive input data indicative of button presses from an input panel 408. Input panel 408 can comprise a plurality of push buttons or other input devices for controlling various aspects of speaker 110. For example, processor 400 can receive input data from input panel 408 for changing volume levels, reciting the IP address of speaker 110, resetting speaker 110, and the like. As further examples, input panel 408 can include an auxiliary power connector for supplying speaker 110 with electricity from an adapter rather than from Power-over-Ethernet. Input panel can also include a connector for a custom button module including various additional inputs. For instance, such a custom button module can include inputs enabling speaker 110 to place outbound Session Initiation Protocol (SIP) calls to one or more predefined extensions, thus allowing the system to function bidirectionally as an intercom. Processor 400 can also be interconnected with a network adapter 410 for communicating over a network (not shown) with other computing devices, such as MNMC 105. It will now be appreciated that speaker 110, via network adapter 410, can also communicate with Internet Protocol (IP) or SIP-capable devices other than MNMC 105. The processor 400 is also interconnected with an electroacoustic transducer (i.e. loudspeaker) 412 and a microphone 414 via an audio adapter 416. The audio adapter 416 includes a digital-to-analog converter (DAC) 418 and an audio amplifier 420. The DAC 418 converts digital signals received from the processor 400 to analog signals to be output to the audio amplifier 420 and on to the electroacoustic transducer 412. Audio amplifier 420 increases the strength of the signal from the DAC 418 so that the electroacoustic transducer 412 can be driven at higher volumes. The audio adapter 416 also includes an analog-to-digital converter (ADC) 422, and a microphone pre-amplifier 424. Acoustic audio signals are captured and translated into electrical signals by microphone 414. The resulting electrical signals are transmitted to pre-amplifier 424. The microphone preamplifier 424 increases the strength of the signals received from microphone 414 and transmits the amplified signals to ADC 422. ADC 422, in turn, converts the analog signal from the pre-amplifier 424 into a digital signal which is sent to processor 400. It will now be appreciated that in some embodiments, speaker 110 can be an analogue speaker adapted with a SIP or IP gateway. The speaker can also be configured to optionally convert the audio data into text, or receive a text message and display the converted audio data in a readable form on a screen 425. The speaker can optionally include a motion detector 427 and be programmed to output specific audio or text data based on detected motion events. Speakers can optionally be equipped with a location detection device 426 such as a GPS system to determine the location automatically.

Figure 5:
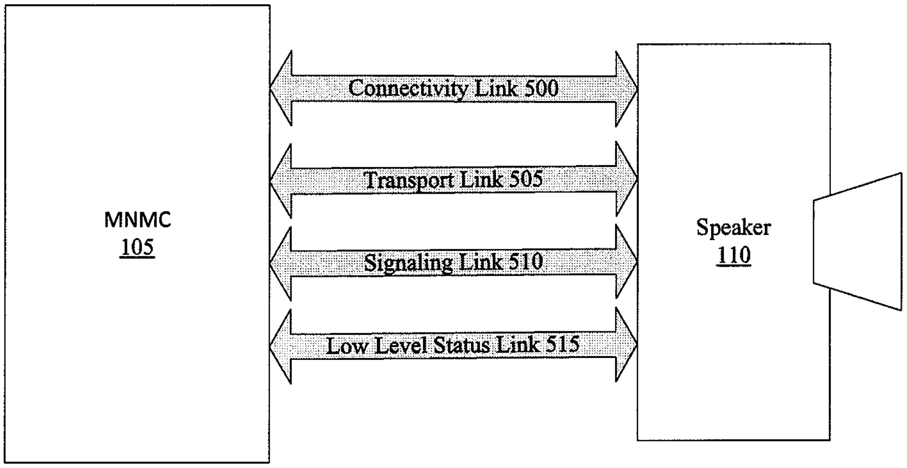
FIG. 5 is a block diagram of network connections between the speaker of FIG. 3 and the MNMC of FIG. 1.

FIG. 5 depicts the network connections between the speaker 110 and the MNMC 105. The speaker 110 interconnects with the MNMC 105 via a connectivity link 500, a transport link 505, a signalling link 510, and a low level status link 515. The connectivity link 500 enables the speaker 110, via the connectivity manager 320, to discover the MNMC 105 and connect to the MNMC 105. The transport link 505 enables the MNMC 105, via the audio module 205, to transmit audio data to the speaker 110, where such data is received by transport manager 330 and audio hardware driver 315. The signalling link 510 enables the MNMC 105, via the speaker manager 225, to issue control messages to the speaker 110, where such messages are handled by signalling manager 325. For example, the speaker manager 225 may issue a control message instructing the speaker 110 to increase its volume. The signalling link 510 also enables the speaker 110, via the diagnostic application 305, to transmit high level diagnostic reports to the MNMC 105. The low level status link 515 enables the speaker 110 to report low level failures to the MNMC 105. Such low level failures can be reported in conjunction with diagnostic application 305, or by low level status manager 310 without the involvement of diagnostic application 305 (it will be appreciated by those skilled in the art that the nature of some low level failures may prevent diagnostic application 315 from even starting). It will now be apparent to one skilled in the art that the connectivity link, the signalling link, or both, could be part of the transport link. In such embodiments, the control messages are carried in-band along with the audio data.

Figure 6:
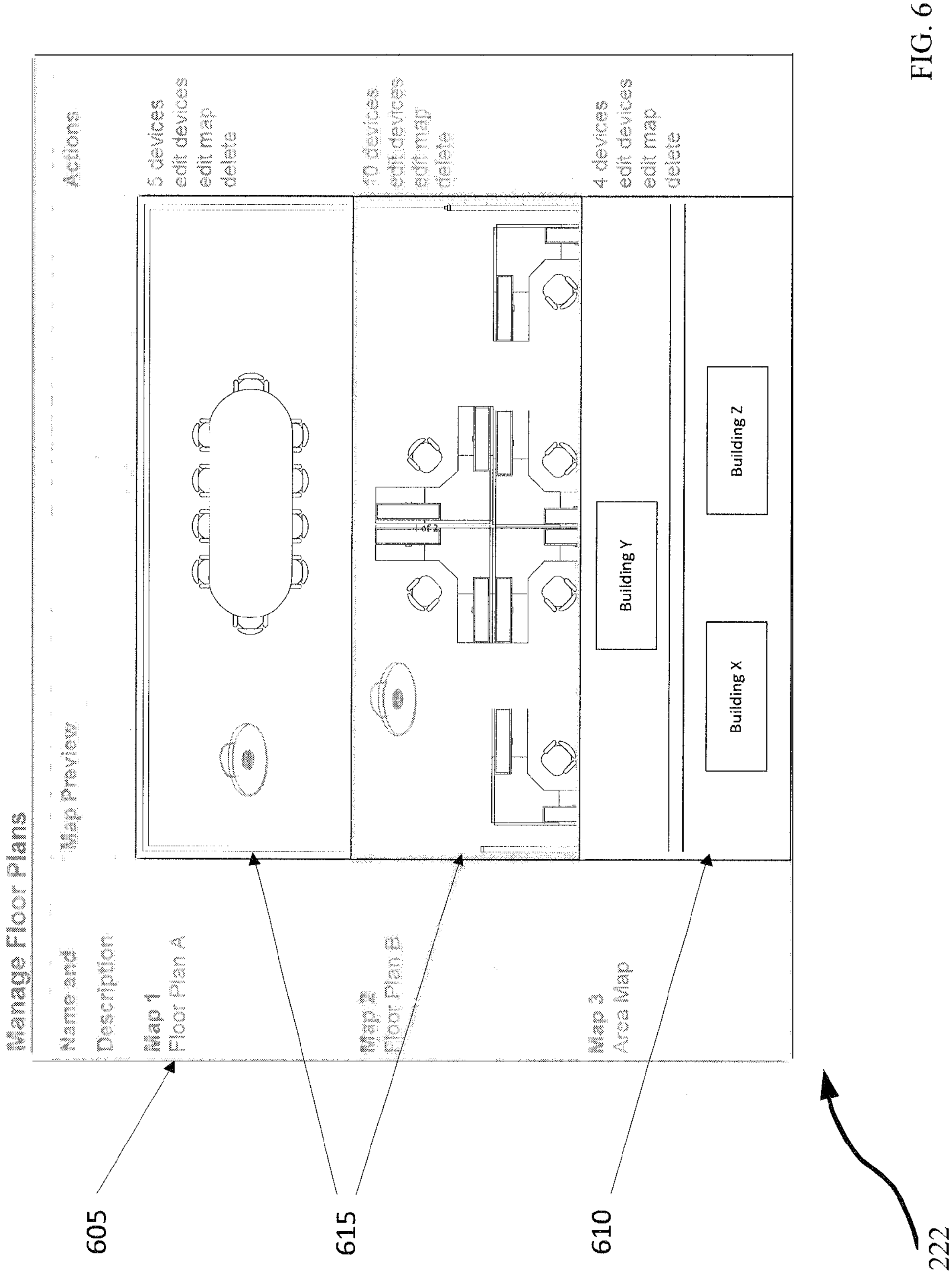
FIG. 6 is an exemplary web interface provided by the MNMC of FIG. 1.

The mass audio notification system 100 enables the users 125, via client devices 120, to broadcast audio messages through the speakers 110. Referring to FIG. 6, the MNMC 105 provides a web interface 222, via the interface application 220, to enable the users 125 to use the client devices 120 to administer the system and broadcast messages. It will now be appreciated that the client devices 120 can be any device that is capable of accessing the network 115 and providing browser functionalities to enable the users 125 to access the web interface 222 provided by the MNMC 105. It will also be appreciated that the client devices interface provided by interface application 220 can also be used by client devices 120 to administer system 100 and broadcast messages. When the client devices interface is being used, a client device 120 can be any client device capable of telephony, such as a landline telephone, a mobile telephone, a personal computer executing a telephony application, and the like. Any such telephony-capable client device 120 can call a predetermined telephone number in order to be connected to, for example, an Interactive Voice Response system maintained by MNMC 105 in order to broadcast messages to speakers 110 and to manage system 100. In some embodiments, interface application 220 can also provide an Application Programming Interface (API) capable of receiving commands from various applications executing on client devices 120 and other external systems.

The MNMC 105, via the user manager 230, maintains three levels of users; the levels include: regular users, administrators, and super administrators. A regular user can log into the MNMC 105 and access all base functionalities, which include: creating and managing notification and notification templates, and viewing reports. An administrator is a user with administrative privileges, and has access to the admin features of the MNMC 105. An administrator can create, edit, and manage users. In addition to having access to the functionalities available to a regular user, an administrator can also add and configure the speakers 110. A Super Administrator is a special administrator account that cannot be deleted from the MNMC 105. This account is created during the initialization of the MNMC 105, and through this account, administrator accounts can be created and revoked. Only the super administrator can delete administrators. There is only one super administrator account. Only the super administrator has access to advanced system level configuration and maintenance functions.

The speakers 110 can be administered via the admin interface 605 of the web interface 222 provided by the interface application 220. FIG. 6 depicts an exemplary admin interface 605 of the present embodiment. The user 125 must login as an administrator to access the admin interface 605. The interface application 220 provides maps of the locations of the speakers 110. Different types of maps are provided. FIG. 6 depicts an exemplary geographical map 610 and a floor plan of a building 615.

Figure 7:
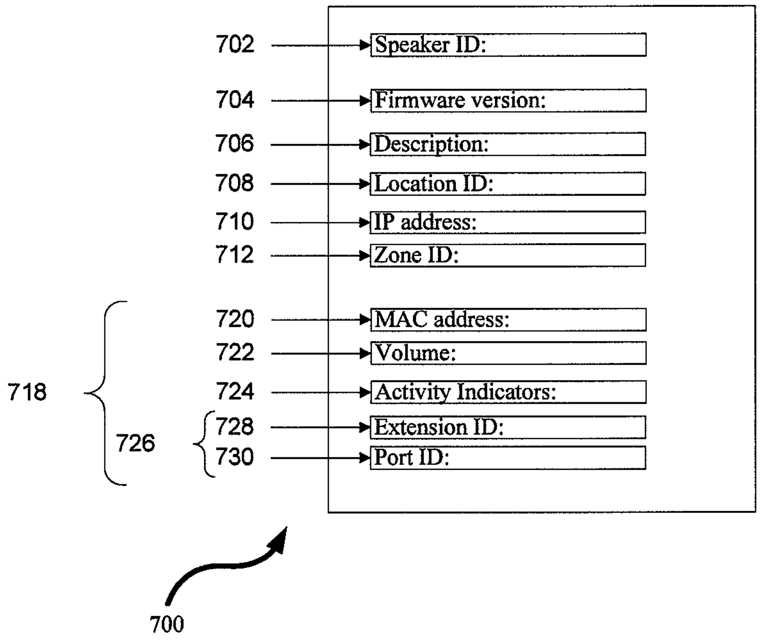
FIG. 7 is an exemplary speaker profile for the speaker of FIG. 3.

The speaker manager 225 maintains a profile of each speaker 110 known to the mass audio notification system 100. FIG. 7 depicts an exemplary speaker profile 700. The speaker profile 700 can include a speaker ID 702, a firmware version 704 indicating the version number of speaker 110's firmware (firmware upgrades can be initiated and managed from MNMC 105) a description 706, one or more location IDs 708 (it will be appreciated that a given speaker 110 may belong to multiple zones, maps and the like, and may thus have a different location ID for each zone or map to which it belongs), an IP address 710, and one or more zone IDs 712. The profile 700 also includes operational parameters 718, also referred to herein as associated environment parameters, associated with the normal operation of the speaker 110 such as a Media Access Control (MAC) Address 720, a volume 722, activity indicators 724, and SIP parameters 726. Volume 722 can be a numerical value specifying the default output volume for the speaker 110. Volume 722 can be dynamically overridden by MNMC 105. Activity indicators 724 can include indicators of call state (for example, whether speaker 110 is on or off hook), registration state, recording indication, and the like. SIP parameters 726 can include an extension ID 728 and a port ID 730. Other exemplary SIP parameters (not shown) include user name, registrar and codecs. SIP parameters 726 are employed by MNMC 105 to communicate with speakers 110 via the phone interface. More specifically, MNMC 105 can patch a client device 120 such as a telephone through to one or more speakers 110 by using SIP parameters 726. It will now be apparent that MNMC 105 can also connect other client devices to speakers 110 using SIP parameters 726, such as a personal computer using the web interface.

The speaker ID 702 is an alphanumeric identifier of the speaker 110 associated with the speaker profile 700. The speaker ID 702 is unique to each speaker 110 within system 100. The description 704 is an alphanumeric description of the speaker 110 associated with the speaker profile 700. Description 704 can be a free-form field for containing various items of information considered to be relevant for the given speaker 110. The location ID 708 is an alphanumeric description of the location of the speaker 110 associated with the speaker profile 700. In particular, location ID 708 identifies a map that the speaker 110 is assigned to. For instance, an exemplary location ID 708 can be, "3rd floor." It will now be apparent that multiple location IDs may be assigned to a single speaker 110. For instance, another map of a portion of the above-mentioned third floor could also include speaker 110. Thus, a second location ID 708 can be used (for example, "3rd floor East wing"). The IP address 710, as will be apparent to those skilled in the art, can be a 32 bit or 128 bit number displayed, for example, in a dot or semi-colon delimited notation such as "192.168.0.1". Other variations on the above formats will also occur to those skilled in the art. In general, IP address 710 identifies speaker 110 in a network. The zone ID 712 is an alphanumeric identifier identifying the zone that the speaker 110 has been assigned to. As mentioned earlier, each speaker 110 can be assigned to a single zone or to a plurality of zones. A zone ID can be used by MNMC 105 to access a certain predetermined group of speakers 110 in order to broadcast a message to that group. In some embodiments, zone ID 712 can include a zone extension (not shown) allowing MNMC to transmit a telephonic broadcast to a group of speakers following the receipt of input data at interface application 220 (for example, from web interface 222, a telephone interface, or an API call). When a new speaker 110 is added to the MNMC 105, the MNMC 105 creates a speaker profile 700 for the new speaker 110.

Figure 8:
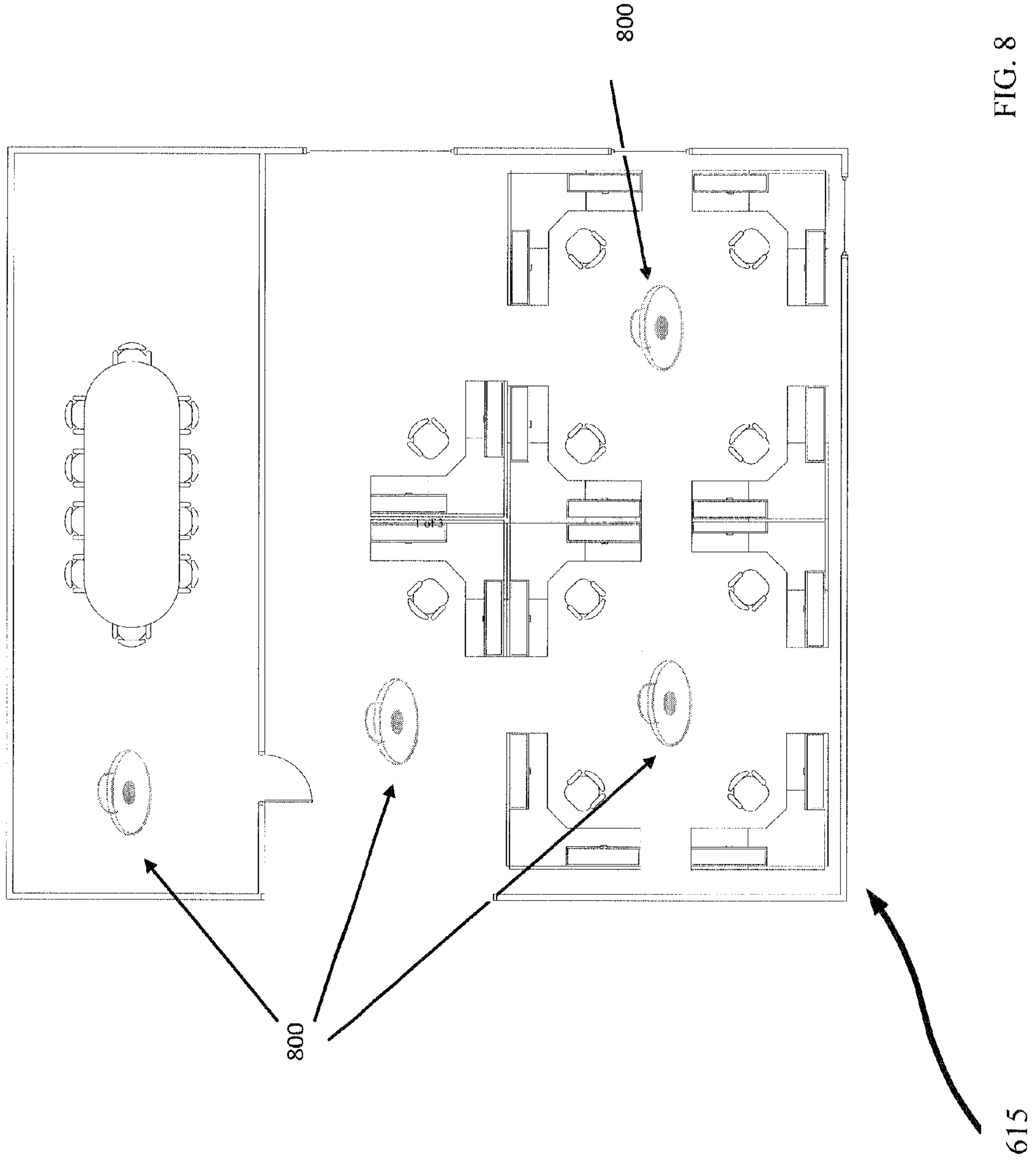
FIG. 8 is an exemplary floor plan provided by the MNMC of FIG. 1.

FIG. 8 depicts an exemplary floor plan 615 of a building having five speaker markers 800 identifying the locations of five speakers 110. It will be understood that the invention is not limited to in-building deployments. Outdoor or combination of outdoor and indoor applications are also possible. When the speakers 110 are physically relocated, the user 125 can relocate the speaker markers 800 to the new locations by moving the speaker markers 800 individually or as a group. The user 125 can relocate the speaker marker 800 from one location of a map to another location of the same map or another map. In general, speakers can be physically relocated on the premises, and input data can be provided to MNMC 105 (from client devices 120, for example) to update floor plan 615. The location of each speaker 110, in addition to being reflected in location ID 708 and Zone ID 712 as discussed above, can be maintained in database 215 of MNMC 105. The location of the speakers that are equipped with a location detection device 426 systems is maintained automatically.

Figure 9:
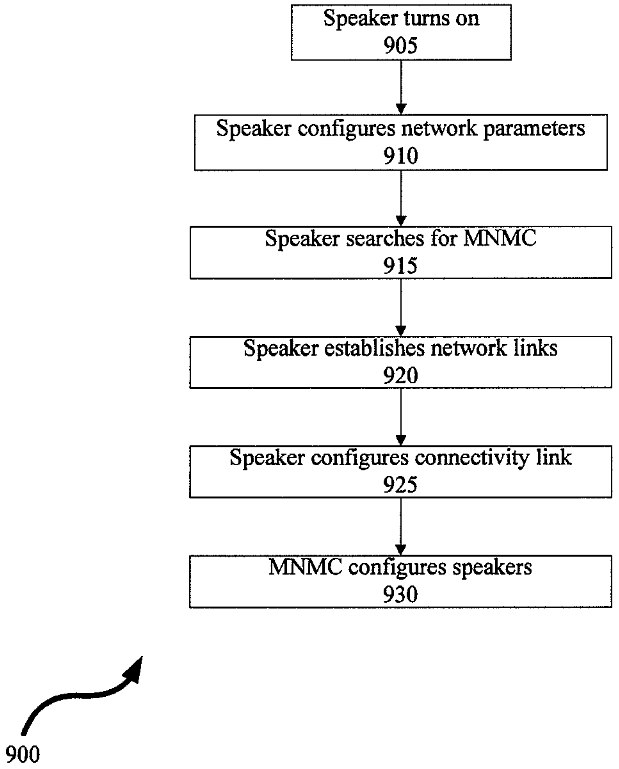
FIG. 9 is a flowchart showing a method for connecting the speaker of FIG. 3 to the MNMC of FIG. 1.

FIG. 9 depicts a method 900 of connecting a speaker 110 to the MNMC 105. At step 905, the speaker turns on. For example, the speaker can be manually turned on by supplying power to speaker 110.

At step 910, the speaker 110 configures its network parameters. For example, the speaker 110 initializes its IP address. Depending on the configuration, the speaker 110 can either retrieve a static IP address from a file maintained within persistent storage 40 of speaker 110, or request an IP address from a Dynamic Host Configuration Protocol (DHCP) server (not shown).

At step 915, speaker 110 searches for MNMC 105. When speaker 110 and MNMC 105 reside on a common local area network (LAN), speaker 110 can find MNMC 105 using any zero-configuration networking protocols such as Service Location Protocol (SLP) (defined by RFC 2608), multicast Dynamic Name Server (DNS)/Dynamic Name Server-Service Discovery (DNS-SD), IPv4 Local-Link addresses (defined by RFC 3927), and IPv6 autoconfiguration (defined by RFC 4862). When speaker 110 and MNMC 105 do not reside on a common LAN, speaker 110 can retrieve a network address of MNMC 105 from, for example, a pre-configured parameter from a configuration file maintained in persistent storage 406. In other embodiments, speaker 110 can retrieve a network address for MNMC 105 from a DHCP server (not shown). It will be appreciated that a DHCP server can be used to obtain a network address for MNMC 105 regardless of whether MNMC 105 and speaker 100 reside on a common LAN. Once speaker 110 has discovered a network address for MNMC 105 as discussed above, speaker 110 can initiate communications with MNMC 105.

At step 920, speaker 110, having identified MNMC 105, connects to MNMC 105 to establish the network links described above (i.e., connectivity link 500, transport link 505, signalling link 510, and low level status link 515). Connectivity link 500 can be based on SIP; transport link 505 can be based on Real-time Transport Protocol (RTP), Real-time Transport Control Protocol (RTCP) or both; signalling link 510 can be based on Extensible Messaging and Presence Protocol (XMPP); and low level status link 515 can be based on Syslog. Other suitable protocols may also occur to those skilled in the art.

At step 925, the speaker 110 configures the parameters for the connectivity link 500. The connectivity link 500 can be based on SIP as defined by Request For Comments (RFCs) 2543 and 3261, which in turn is based on the Internet Protocol. Values for the relevant SIP parameters can be retrieved from persistent storage 406. SIP parameters can also be received from MNMC 105 during signalling link 510 setup at step 920.

At step 930, the MNMC 105 registers, via the speaker manager 225, the speaker 110. The speaker manager 225 searches for the speaker profile 700 associated with the speaker 110 that is requesting to register with the MNMC 105. If speaker manager 225 fails to locate the speaker profile 700 associated with the speaker 110 that is requesting to register with the MNMC 105, speaker manager 225 rejects the registration request by sending a deny message to the speaker 110 containing the appropriate error code. Speaker manager 225 can also notify one or more client devices 120 so that one or more users 125 can take action to remedy the rejection. For example, the rejected speaker 110 may be a newly installed speaker that must be enabled at MNMC 105. In some embodiments, speaker manager 225 can be configured to automatically grant any registration request. In such embodiments, if a profile 700 is not located for a speaker 110, a new profile is created and provided to the newly registered speaker 110. When speaker manager 225 locates the speaker profile 700 associated with the speaker 110 that is requesting registration with the MNMC 105, the speaker manager 225 requests operational parameters 718 from the speaker 110 in order to ensure synchronization between the operational parameters stored within speaker profile 700 and the parameters stored within speaker 110. Speaker manager 225 can also, as part of the performance of step 930, determine whether any update of the configuration parameters is necessary. Such a determination can be made by comparing firmware version 704 to a current firmware version number maintained by speaker manager 225. In some embodiments, if version 704 is lower than the current firmware version, speaker manager 225 can initiate a firmware update with speaker 110. In other embodiments, speaker manager 225 can maintain a current firmware version and a minimum firmware version, and an update can be initiated only when version 704 is lower than the minimum version number. If the speaker manager 225 determines that updates are needed, the speaker manager 225 can issue update commands to the speaker 110, via the signalling link 510. After step 930, the speaker 110 is ready to receive instructions or audio data from the MNMC 105.

Figure 10:
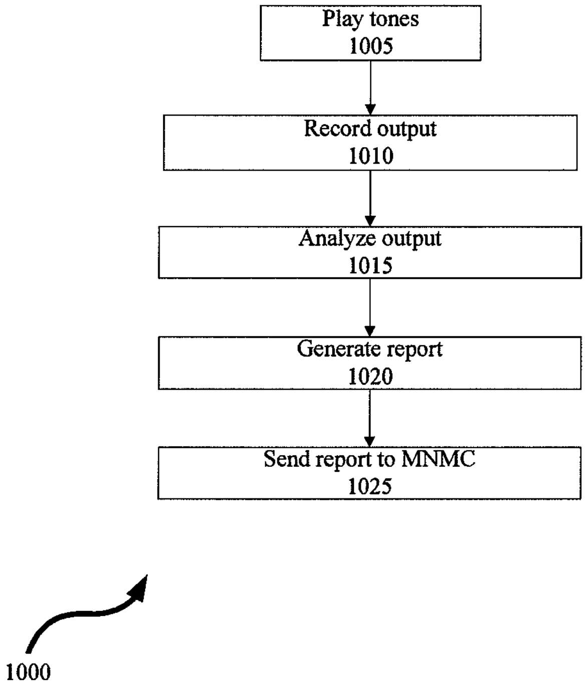
FIG. 10 is a flowchart showing a method for a speaker of FIG. 1 to conduct an audio self-test.

FIG. 10 depicts a method 1000 for the speaker 110 to perform an audio self-test. The diagnostic application 305 can, periodically or in response to a command from the MNMC 105, perform the self-test.

At step 1005, the diagnostic application 305 outputs tones via audio adapter 416 and electroacoustic transducer 412. The tones can be pre-recorded tones stored in the persistent storage 406, At step 1010, the diagnostic application 305 records, via the microphone 414, the tones outputted by the electroacoustic transducer 412. At step 1015, the diagnostic application 305, via the processor 400, analyzes the recorded tones. In the present embodiment, the diagnostic application 305 uses a discrete Fourier transform to compare the recorded tones to the ambient noise level around the speaker 110 to verify that the speaker 110 is operating properly. At step 1020, the diagnostic application 305, via the processor 400, generates a report to diarize the results of the test. At step 1025, the diagnostic application 305, via the network adaptor 420, sends the report to the MNMC 105, via the signalling link 510.

The diagnostic application 305 can also detect malfunctions such as input panel failure. When the diagnostic application 305 detects a malfunction, the diagnostic application 305 logs the malfunction via the signalling link 510 and optionally initiate alarms.

Figure 11:
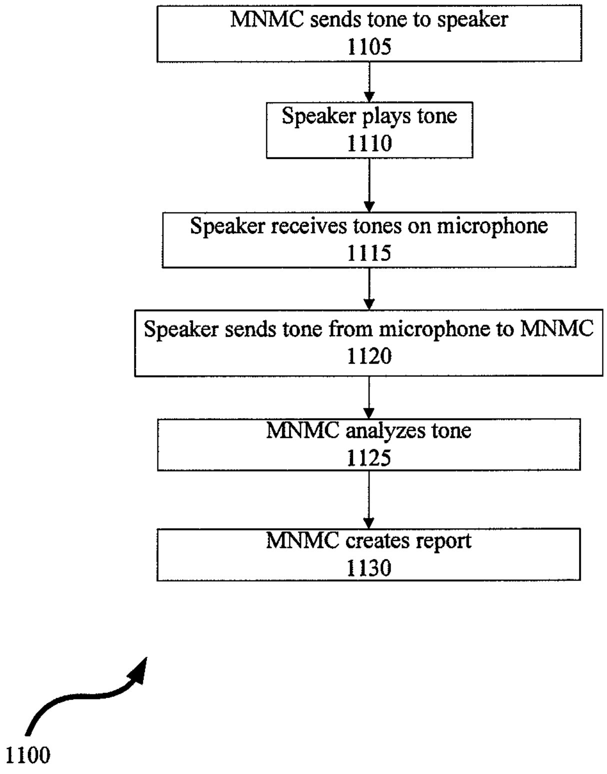
FIG. 11 is a flowchart showing a method for conducting a networked audio self-test of the speaker of FIG. 3.

FIG. 11 depicts a method 1100 for conducting a networked self test. Whereas method 1000 tests primarily the functionality of the components of speaker 110, method 1100 also tests network and MNMC functionality. Method 1100 begins at block 1105, at which MNMC 105 transmits a test tone to one or more speakers 110. The tone can be maintained in database 215 at MNMC 105, for example. The tone can be transmitted over connectivity link 500 and transport link 505.

Upon receipt of the tone from MNMC 105 at speaker 110, method 1100 proceeds to block 1110. At block 1110, speaker 110 plays the tone at transducer 412, via audio adapter 416. Proceeding to block 1115, audio adapter 416 receives, via microphone 414, the output of transducer 412. Next, at block 1120, speaker 110 transmits the recorded output of transducer 412 to MNMC 105 via network adapter 410. At block 1125, MNMC 105 receives the recorded speaker output and analyzes it (for example, by Fourier transform as discussed above). Once the analysis at block 1125 is complete, MNMC 105 can report the results of the test to, for example a client device 120 (for instance, an administrator terminal). In some embodiments, the analysis can be performed on the speaker 110 and only the results can be sent to the MNMC 105, as described in conjunction with FIG. 10.

Figure 12:
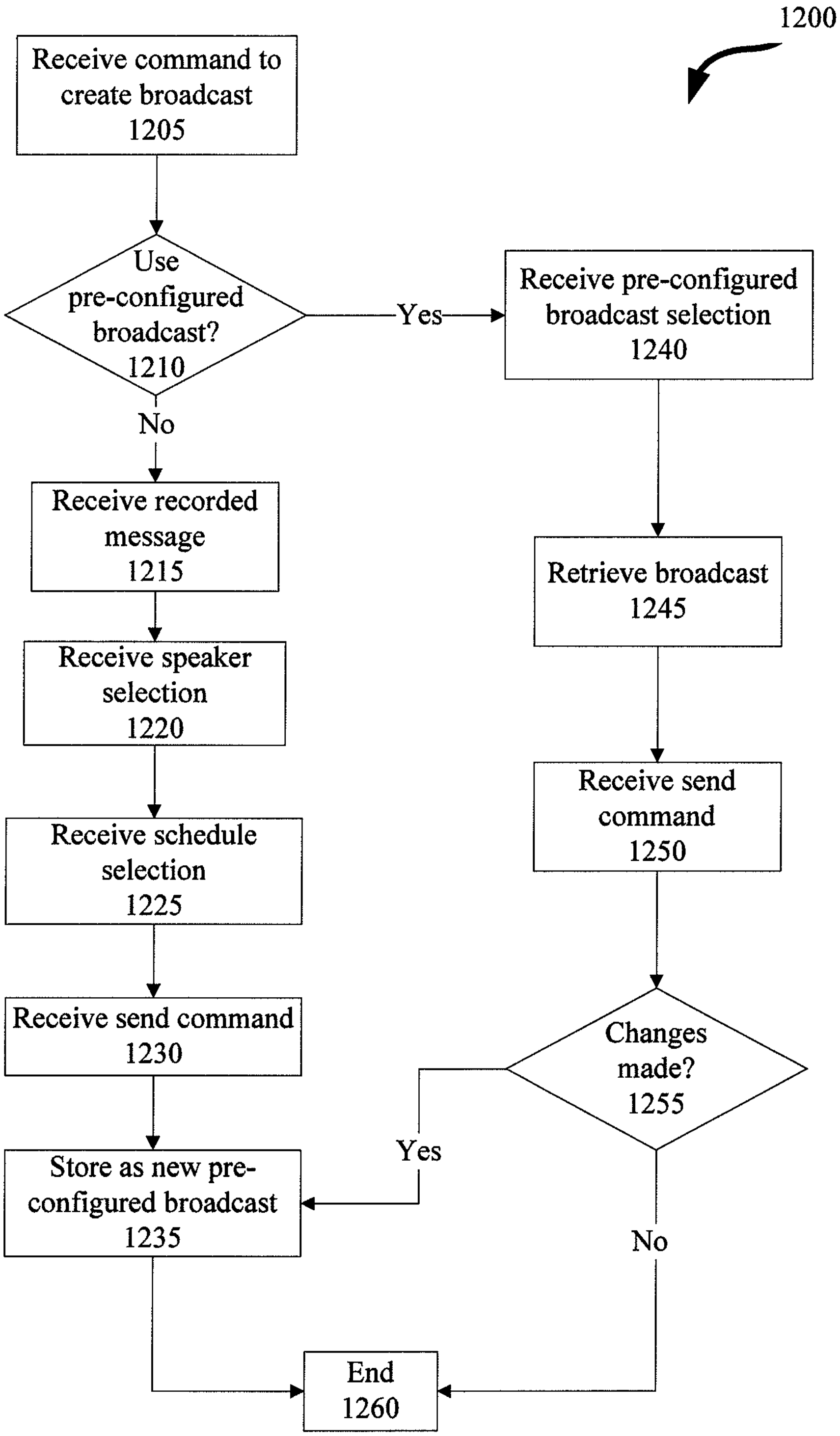
FIG. 12 is a flowchart showing a method for the MNMC of FIG. 1 to create a broadcast.

FIG. 12 depicts a method 1200 for broadcasting a message on the mass audio notification system 100. At step 1205, a command to create a broadcast is received at MNMC 105 via interface application 220. As discussed above, it will be appreciated that such a command can originate from a client device 120 accessing a web or telephone interface, or from a client device 120 or other device making an API call to MNMC 105.

Proceeding to block 1210, MNMC 105 can determine if the broadcast is to be created using a pre-configured broadcast. The determination can be made on the basis of input data received at MNMC 105. Interface application 220 can receive input data from a client device 120 (for example, via web interface 222) indicating that a pre-configured broadcast is not to be used and that a new broadcast is therefore to be created. Method 1200 can then proceed to block 1215 in order to begin creating a new broadcast.

At block 1215, MNMC 105 can receive a recorded message. It will now be apparent to those skilled in the art that the recorded message received at block 1215 can be received in a variety of ways. In some embodiments, a message can be maintained in a memory of client device 120 and uploaded to MNMC 105 from client device 120. In other embodiments, input data can be received from a client device 120 indicating that a message is to be provided to MNMC 105 via a telephone interface. In such embodiments, MNMC 105 can receive contact information (such as a telephone number) for client device 120 via web interface 222. Following receipt of the contact information, interface application 220 of MNMC 105 can be configured to connect to client device 120 by initiating a telephone call using the contact information. Once a connection is established between MNMC 105 and client device 120, a message can be recorded via the telephone interface of interface application 220.

Figure 13:
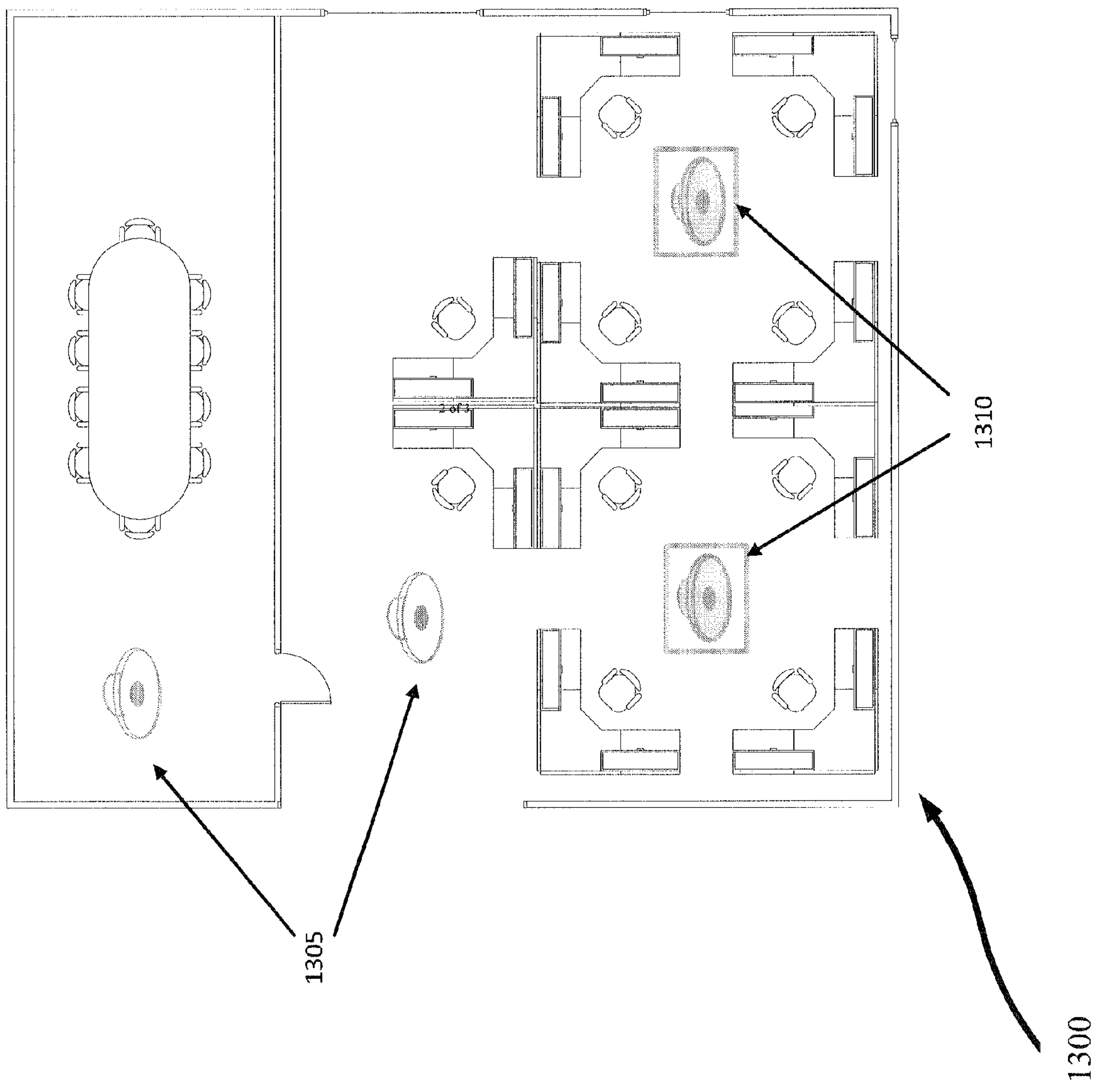
FIG. 13 is another exemplary floor plan provided by the MNMC according to an embodiment.

Once the recorded message is received at block 1215 and stored in persistent storage module 213, method 1200 proceeds to block 1220. At block 1220 MNMC 105 can receive a selection of speakers to which the recorded message is to be delivered. The speaker selection can be received at interface application 220 from client device 120 via web interface 222 or other interfaces as discussed above. FIG. 13 depicts an exemplary floor plan 1300 presented to client device 120 via web interface 222, for receiving speaker selections. Floor plan 1300 illustrates two unselected speaker markers 1305 and three selected speaker markers 1310. Selected speaker markers 1310 can be differentiated visually from unselected speaker markers 1305 by, for example, a highlight. It will now be apparent that while selections of individual speakers can be received at MNMC 105, selections of groups of speakers can also be received. For example, a list of zones can be presented to client device 120. MNMC 105 can therefore receive a selection of a zone ID, and determine that all speakers having the selected zone ID 712 in their profiles 700 have been selected for the broadcast at block 1220.

Proceeding to block 1225, MNMC 105 can receive schedule selections for the broadcast. A broadcast can be scheduled to play at a certain time in the future, or to repeat at a given frequency or at certain specified times. Schedule selections can be received from client devices 120 via interface application 220. It will be appreciated that performance of block 1225 can be omitted when no scheduling is desired for the broadcast.

Method 1200 then proceeds to block 1230. At block 1230, MNMC 105 can receive a command to transmit the broadcast to the ones of speakers 110 selected at block 1220. It will be understood that the command received at block 1230 can be received from a client device 120, or from MNMC 105 itself, if scheduling data was received at block 1225. Following receipt of the send command at block 1230, MNMC 105 is configured to transmit the broadcast over transport link 505 to the selected ones of speakers 110.

Method 1200 can then proceed to block 1235, at which the sent broadcast is stored in database 215 of MNMC 105 as a pre-configured broadcast.

A wide variety of pre-configured broadcasts can be maintained in database 215 for use if the determination at block 1210 is affirmative. Pre-configured broadcasts can contain previously recorded messages, speaker selections and scheduling data. Such pre-configured broadcasts can be used, for example, in emergency situations. For instance, if the mass audio notification system 100 is installed at a location that stores dangerous chemicals, a pre-configured broadcast can be stored in database 215 which contains a recorded message advising people at the location to evacuate because of a chemical spill. In the event that such a spill is detected, a user 125 could then issue a command to transmit the pre-configured broadcast.

If the determination is affirmative—that is, if MNMC 105 receives input data indicating that a pre-configured broadcast should be used to create the broadcast—method 1200 proceeds to block 1240 instead of 1215 as described above. At block 1240, MNMC 105 can receive a selection of one of the plurality of pre-configured broadcasts stored within database 215. Such selection can be received from a client device 120, for example, via web interface 222. Following selection of a pre-configured broadcast, at block 1245 MNMC 105 retrieves the selected broadcast from database 215.

Proceeding to block 1250, MNMC 105 can receive a command to send the broadcast and in response send the broadcast, as discussed above in regards to block 1230. Following transmission of the broadcast, MNMC 105 can be configured to determine at block 1255 whether changes were made to the pre-configured broadcast prior to transmission. It will now be apparent to those skilled in the art that block 1250 can include the reception of recorded messages, speaker selections and scheduling data as in blocks 1215, 1220 and 1225. In other words, block 1250 can include the editing of the pre-configured broadcast by a user 125. If the determination at block 1255 is affirmative, the edited version of the pre-configured broadcast selected at block 1240 is stored in database 215 as a new pre-configured broadcast. If the determination at block 1255 is negative, there is no need to store a new pre-configured broadcast and method 1200 ends at block 1260.

It will be understood that in some performances of method 1200, the receipt of a send command by MNMC 105 at block 1230 or block 1250 can be omitted. In such embodiments, method 1200 can proceed from the configuration of the broadcast directly to storing the broadcast as a new pre-configured broadcast for later use at block 1235.

Figure 14:
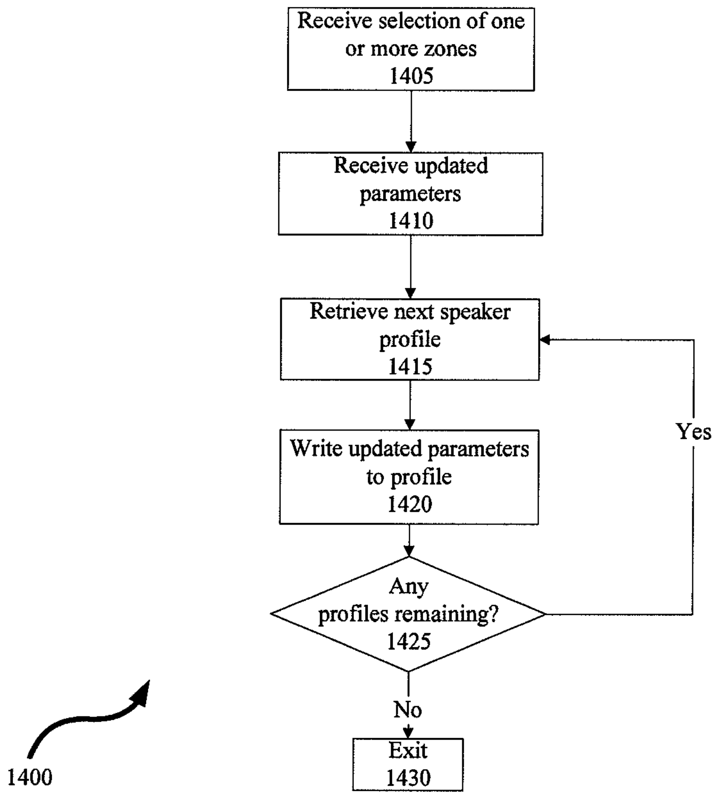
FIG. 14 is a flowchart showing a method for configuring a plurality of speakers.

Referring now to FIG. 14, a method 1400 of configuring speakers 110 is shown. Method 1400 can be conducted by control module 200 of MNMC 105, and allows for a one or a plurality of speakers 110 to be remotely configured substantially simultaneously.

Method 1400 begins with the performance of block 1405, in which a selection of a zone is received at MNMC 105. The selection of the zone can be received at interface application 220 from a client device 120. Such a selection can be made at client device 120 by, for example, entering a number corresponding to the zone at a telephone or selecting the zone from a floor plan displayed at client device 120 or via an API call.

Method 1400 then proceeds to block 1410, at which MNMC 105 receives, via interface application 220, updated parameters from client device 120. The updated parameters can be any or all of the parameters discussed above in connection with speaker profiles 700.

Proceeding to block 1415, MNMC 105 retrieves from database 215 a speaker profile 700 having a zone ID 712 which matches the zone selection received at block 1405. MNMC 105 then performs block 1420, in which the updated parameters (for example, a new volume setting) received at block 1410 are written to the retrieved speaker profile 700.

MNMC 105 then determines, at block 1425, whether any profiles remain to be updated. MNMC 105 can therefore be configured to search database 215 for additional profiles 700 which have zone IDs 712 matching the zone selection received at block 1405. As long as the determination at block 1425 is affirmative (that is, as long as there remain speaker profiles 700 belonging to the selected zone) method 1400 loops through blocks 1415, 1420 and 1425. When the determination at block 1425 is negative, indicating that no speaker profiles 700 remain in the selected zone to be updated, method 1400 ends at block 1430.

It will now be apparent that method 1400 can also be adapted to instruct multiple speakers 110 to simultaneously, or substantially simultaneously, begin self tests as discussed above in regards to FIGS. 11 and 12.

It will now be apparent that the steps of the above methods can be varied and likewise that various specific design choices can be made relative to how to implement various steps in the methods.

A portion of the disclosure of this document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A mass audio notification system for use in an internet protocol network, the system comprising:

a plurality of speakers connected to said internet protocol network, each speaker in said plurality of speakers comprising a transport manager and a diagnostic application;

a server connected to said internet protocol network, said server configured to send audio data to one of said plurality of speakers via a transport link, said server further configured to send control commands to one of said plurality of speakers via a signalling link, said signaling link including a second protocol based on internet protocol;

wherein said transport link is managed by said transport manager corresponding to one of said plurality of speakers, and wherein said transport link includes a first protocol based on internet protocol; and wherein said audio data is received by said transport manager; and wherein each diagnostic application corresponding to each of said plurality of speakers performs diagnostics on a corresponding one of said plurality of speakers, said server receiving status messages from said one of said plurality of speakers via a low level status link, said low level status link including a third protocol based on internet protocol; and wherein said at least one of said plurality of speakers comprises a low level status manager;

said low level status link being managed by said low level status manager;

said low level status manager performing diagnostics on said one speaker, each diagnostic application and said low level status manager generating a diagnostic report based on performed diagnostics, said diagnostics reports are transmitted to said server over said signaling link and said low level status link.

2. The system of claim 1, further comprising a backup server and wherein a heartbeat process is used to keep track of correct operations of said server and said backup server.

3. The system of claim 1, wherein one of said plurality of speakers includes a location detection device.

4. The system of claim 1, wherein said at least one of said plurality of speakers connects to said server via a connectivity link, said connectivity link including a fourth protocol based on internet protocol.

5. The system of claim 1, wherein said server comprises an audio server and a control server.

6. The system of claim 5, wherein said audio server comprises a private branch exchange (PBX).

7. The system of claim 5, wherein said control server comprises a web server.

8. A method for outputting audio data from a server on a plurality of speakers, said server interconnected with said plurality of speakers via an internet protocol network in a mass audio notification system, said method comprising:

registering one of said plurality of speakers, each speaker in said plurality of speakers comprising a transport manager, a low level status manager, a signaling manager and a diagnostic application;

performing diagnostics on said one of said plurality of speakers, said diagnostics being executed by said low level status manager and said diagnostic application;

generating a diagnostic report based on said diagnostics, said diagnostic reports being generated by said diagnostic application and said low level status manager;

transmitting said diagnostic report to said server over a signaling link and a low level status link, said signaling link being managed by said signaling manager and said low level status link being managed by said low level status manager; and sending audio data over a transport link to said one of said plurality of speakers to cause said one of said plurality of said speakers to output said audio data, said one transport link managed by a transport manager, said transport manager corresponding to said one of said plurality of speakers.

* * * * *